Nov. 25, 1930. W. W. STUART 1,782,668
OIL BURNER
Filed Sept. 21, 1929
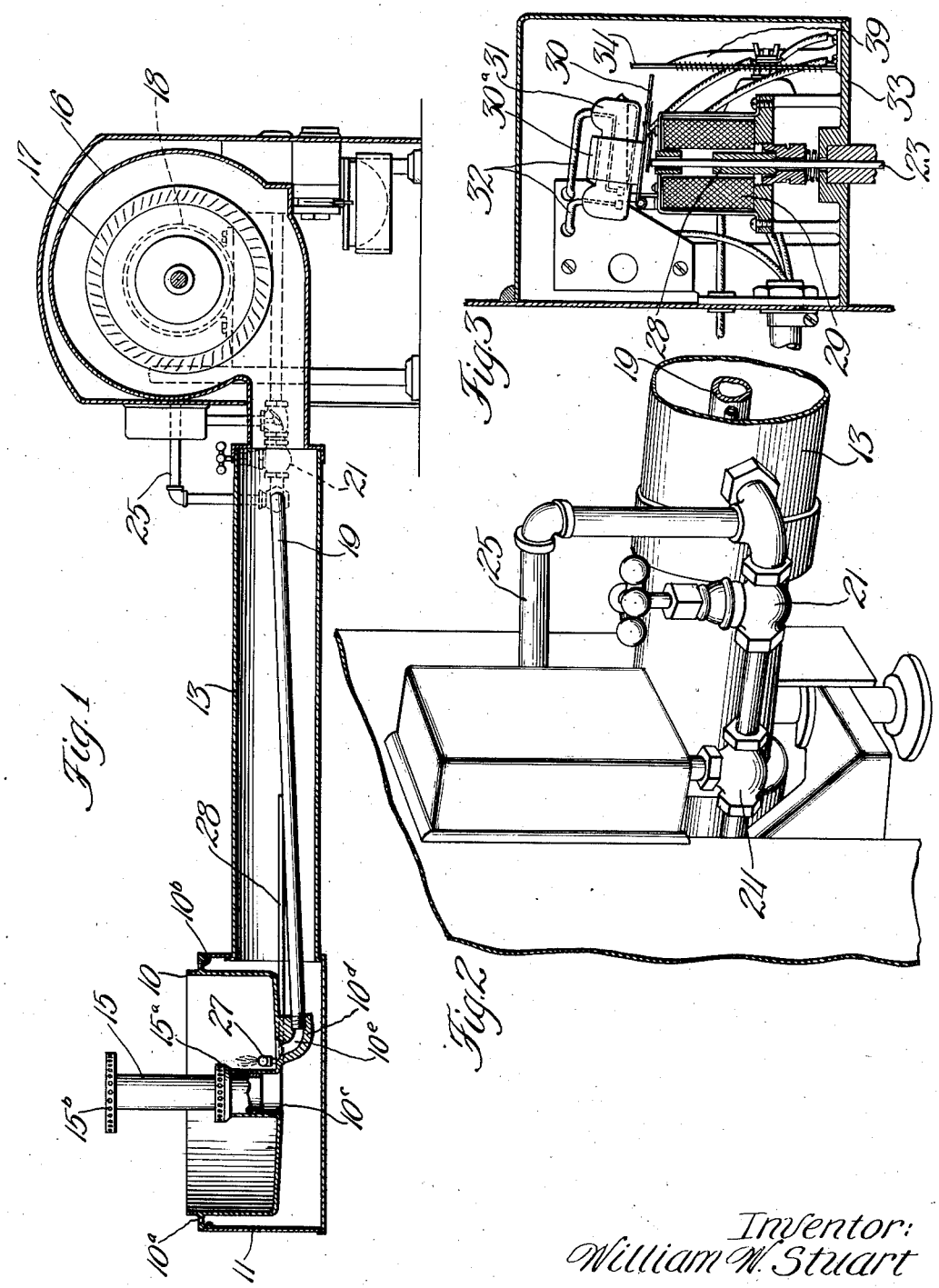
Inventor:
William W. Stuart
By Williams, Bradbury, McCaleb & Hinkle
Attys.

Patented Nov. 25, 1930

1,782,668

UNITED STATES PATENT OFFICE

WILLIAM W. STUART, OF DES MOINES, IOWA, ASSIGNOR TO FRANKLIN OIL HEATING INCORPORATED, OF COLUMBUS, OHIO, A CORPORATION OF OHIO

OIL BURNER

Application filed September 21, 1929. Serial No. 394,281.

This invention relates to improvements in oil burners and has for an object to provide means which will expel the oil from the fuel line in the vicinity of the fire pot or bowl after closure of the fuel shut-off valve.

Another object resides in the provision of means to supply auxiliary air to the fuel line during an over-run of the motor after the fuel valve has been closed.

Other objects relate to the details and features of the apparatus hereinafter described and illustrated in the accompanying drawings, in which Fig. 1 is a vertical section through an embodiment of my invention;

Fig. 2 is a detail in perspective of a portion of the apparatus;

Fig. 3 is a vertical section through the motor control and delay mechanism, the motor switch being illustrated in elevation.

In the drawings, 10 indicates a fire pot or bowl surrounded by a spaced casing member 11. A flange $10^a$ extends across the annular opening at the top of the space between the casing and bowl as illustrated in Fig. 1. Apertures $10^b$ are provided in the flange $10^a$ for the emission of air to assist in combustion.

Leading to the casing 11 is the main air duct 13. The bowl 10 is provided with a centrally located upstanding tubular sleeve $10^c$ which is in communication with the casing 11. Seated in the tubular sleeve $10^c$ is a central air distributor 15 having a lower apertured distributor head $15^a$ and an upper apertured distributor head $15^b$.

In communication with the duct 13 is the casing of the blower 16 having the impeller or fan 17 actuated by an electric motor 18 or the like indicated in dotted lines in Fig. 1. The blower supplies air in desired amount and at desired pressure to the duct 13 and therethrough to the space between the casing 11 and fire pot 10. It is disseminated through the distributor heads $15^a$ and $15^b$ and also through the apertures $10^b$ for admixture with the fuel gas when the burner is in operation.

There is provided a fuel line 19 in communication with any suitable source of supply of liquid fuel. This fuel line extends through the duct 13 and in the form illustrated is downwardly inclined to the apertured boss $10^b$ on the bottom of the bowl 10, this boss being provided with the duct $10^a$ in communication with the fire pot 10 at the bottom thereof. The fuel line 19 is threaded into engagement with the boss $10^d$ as illustrated. In the fuel line 19 is provided a manually operable shut-off valve 21. There is also provided an automatic shut-off valve 23, this being of any suitable construction and arranged to shut off the flow of oil automatically in the valve casing 24 when the desired temperature of the house, or the like, is obtained from operation of the oil burner. Leading from and communicating with the casing of the blower 16 is an auxiliary air supply pipe 25 which leads to and communicates with the fuel line 19 between the valve 21 and the fire pot 10.

A pilot light 27, in the embodiment illustrated, is located in the fire pot 10, preferably adjacent the oil duct $10^e$, and gas is supplied to it through the pipe 28 as illustrated in Fig. 1.

For the form illustrated in the drawings there is preferably provided an automatic control mechanism, such as that illustrated in the pending application of Frame, Serial No. 175,293, or some equivalent means, to continue the blower 16 in operation for a period of time after shut off of the oil supply by the magnetic valve 23.

This mechanism includes the solenoid plunger 28 reciprocable in the hollow bore of the solenoid magnet 29. The stem of the valve 23 is continued sufficiently to project above the magnet 28 when the valve is in open position. Overlying the stem and valve 23 is the pivoted plate 30 having the spaced spring clips $30^a$ thereon, to which is held the mercury switch 31 of well-known construction, to which run the leads 32 in circuit with the electric motor which operates the fan. The plate 30 projects to one side of the magnet 29 and projecting from the base plate 33 upwardly to above the plane of plate 30 is a thermostatic warping bar or leaf 34 of bimetallic construction and surrounded by an electric heating coil 39 which is in circuit with a room thermostat or the like (not shown) and is also in circuit or in parallel with the solenoid magnet 29.

When the room thermostat opens its circuit due to the attaining of the desired temperature around it, the circuit through the magnet 29 and the heating coil 39 will be opened and the valve 23 will drop to closing position due to termination of the attraction of the magnet for the plunger 28. This would normally permit the plate 30 to drop to the position illustrated in Fig. 3 in which position the switch 31 opens the circuit through the motor but the heating coil 39 has been in circuit during the period in which the valve 23 is open and under the influence of its heating effect the thermostatic bar 34 has been warped so that the upper end underlies the plate 30 and this will prevent dropping of the plate and opening of the motor circuit until the bar 34 cools off sufficiently to move from beneath the plate 30. By proper selection of the thermostatic leaf and its heating coil it will thus delay opening of the motor circuit for a desired period of time following shut-off of the valve 23. This insures a continuation of the motor operation and delivery of air to the distributor 15 for such period of time and also insures delivery of air through the auxiliary duct 25 into the fuel line 19 during this period of over-run of the motor. It will be apparent that the oil remaining in the fuel line 19 outwardly of the juncture therewith of the auxiliary duct 25 will be forcibly expelled by this air into the bowl in admixture with the auxiliary air which will enhance its combustion as well as deliver it into the bowl where it will receive additional air for combustion from the lower distributor head 15$^a$.

This auxiliary air supply and over-run of the motor therefore contribute to the expulsion of oil from adjacent the bowl 10 and the combustion thereof so that deposit of carbon or gummy oil in the oil line where it is subjected to the influence of the heat of combustion is prevented and better combustion of the oil is believed to result during normal operation. By locating the pilot light 27 adjacent the duct 10$^e$ the combustion of this expelled oil, particularly during over-run, is also assisted.

This arrangement is particularly adapted to the type of burner illustrated wherein a supply of oil is maintained in the bottom of the bowl 10 for vaporization or gasification during the operation of the burner. Obviously after cessation of the supply of oil due to shut-off of the valve 23, combustion of the oil remaining in the pot will continue until it is consumed, and this brings the zone of combustion closer to the fuel line than during normal operation, so that without the means to expel the oil from the fuel line in the vicinity of the pot 10 there would be a tendency for carbon to form and to clog the fuel supply duct 10$^e$.

My invention may also be utilized with manually controlled burners as will be obvious where shut-off of the oil may be effected through either a manual or automatic valve and where the period of over-run of the motor may be determined either by automatic or manual control means.

While I have referred to the member 10 as a fire pot, in the type of apparatus illustrated it functions as a fire pot only for a short period of time after starting and for a period of time after closure of the fuel valve but it will be apparent that the invention is applicable to apparatus in which the member 10 will be used as a fire pot continuously.

It will be apparent that my invention is susceptible of modification and departure from the form illustrated and described, and I do not wish to be restricted to such form except as I am restricted thereto by the claims properly interpreted and construed.

What I claim is:

1. Apparatus of the class described comprising a pot, means to supply oil thereto comprising a duct, a valve therefor, air supply means communicating with said pot and including a fan, a motor actuating said fan, means connecting said air supply means and said oil duct at a point between the discharge end of the latter and said valve, and means to continue said motor in operation for a desired period of time after the closure of said valve, whereby oil in said duct between said valve and said pot will be discharged into said pot.

2. Apparatus of the class described comprising a pot, means to supply oil thereto including a duct, a valve therefor, air supply means comprising an air duct means to distribute air therefrom in said pot, a fan in communication with said air duct and a motor actuating said fan, means connecting said air supply means and said oil duct at a point between the discharge end of the latter and said valve, and means to continue said motor in operation for a desired period of time after the closure of said valve, whereby oil in said duct between said valve and said pot will be discharged into said pot.

3. Apparatus of the class described comprising a pot, means to supply oil thereto comprising a duct having a portion lower than the floor of said pot, a valve therefor, air supply means including a duct, a fan in communication therewith, a motor actuating said fan, means connecting said air supply means and said oil duct at a point between the discharge end of the latter and said valve, and means to continue said motor in operation for a desired period of time after the closure of said valve, whereby oil in said duct between said valve and said pot will be discharged into said pot.

4. Apparatus of the class described comprising a pot, means to supply oil thereto including a duct, an electrically actuated fuel valve therefor, air supply means including a duct, a fan in communication therewith, an electrically actuated motor actuating said fan, means connecting said air duct and said oil duct at a point between the discharge end of the latter and said valve, and means to continue said motor in operation for a desired period of time after the closure of said valve, whereby oil in said duct between said valve and said pot will be discharged into said pot.

In witness whereof, I hereunto subscribe my name this 16th day of September, 1929.

WILLIAM W. STUART.